United States Patent [19]

Roche et al.

[11] Patent Number: 4,719,937

[45] Date of Patent: Jan. 19, 1988

[54] MARINE RISER ANTI-COLLAPSE VALVE

[75] Inventors: Joseph R. Roche, Humble; Gabriel G. Alexander, Houston, both of Tex.

[73] Assignee: Hydril Company, Los Angeles, Calif.

[21] Appl. No.: 802,997

[22] Filed: Nov. 29, 1985

[51] Int. Cl.⁴ ............................................. F16K 17/12
[52] U.S. Cl. ...................... 137/114; 73/714; 73/756; 137/236.1; 137/495; 137/526; 166/335
[58] Field of Search ................. 73/756, 714; 166/335; 137/81.2, 113, 114, 155, 217, 236.1, 495, 526, 556, 533, 533.17, 538, 494; 166/359, 350, 367; 60/593, 534

[56] References Cited

U.S. PATENT DOCUMENTS

| | | | |
|---|---|---|---|
| 309,991 | 12/1884 | Steinberger | 137/533.17 |
| 618,903 | 2/1899 | Prince | 137/494 X |
| 1,186,780 | 6/1916 | Henneböhle | 137/494 |
| 2,308,583 | 1/1943 | Berges | 137/526 |
| 2,948,262 | 8/1960 | Gratzmuller | |
| 3,114,387 | 12/1963 | Barkan et al. | 137/494 |
| 3,159,378 | 12/1964 | Haag | 251/325 |
| 3,720,221 | 3/1973 | Hufeld et al. | |
| 3,893,440 | 7/1975 | Dooley | 137/494 X |
| 3,917,220 | 11/1975 | Gilmore | |
| 3,931,738 | 1/1976 | Daramonoff et al. | 73/714 |
| 4,059,148 | 11/1977 | Blomsma | 166/359 |
| 4,111,227 | 9/1978 | Sigott et al. | 137/494 X |
| 4,248,046 | 2/1981 | Fornell | 60/534 X |
| 4,437,309 | 3/1984 | Suzuki | 60/593 X |
| 4,437,514 | 3/1984 | Canalizo | 137/155 X |

OTHER PUBLICATIONS

Vetco Offshore Inc advertisement in "Composite Catalog published by World Oil (1978–1979), p. 6857.

Primary Examiner—Martin P. Schwadron
Assistant Examiner—Stephen M. Hepperle
Attorney, Agent, or Firm—Dodge, Bush & Moseley

[57] ABSTRACT

A marine riser anticollapse valve is disclosed for preventing a marine riser from collapsing under external sea water pressure in the event of a sudden loss of internal drilling fluid pressure. An external valve structure is provided for each of a plurality of openings in the wall of a riser pup joint. Each of the valve structures includes a cylinder having an opening in communication with a body wall opening. A piston in each cylinder is subject to sea water pressure but is prevented from opening when riser bore pressure of a sufficient magnitude is applied internally to the piston via the pup joint opening and cylinder opening. When the riser bore pressure falls, the piston is driven to an open position allowing sea water to enter the riser.

14 Claims, 10 Drawing Figures

U.S. Patent  Jan. 19, 1988  Sheet 1 of 4  4,719,937
FIG. 1
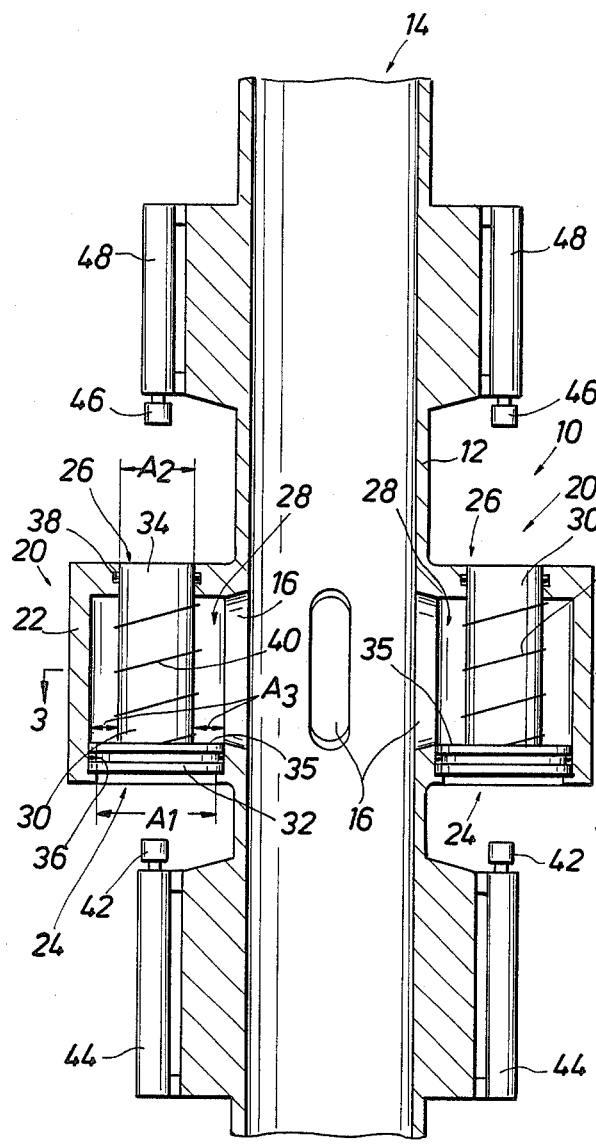
FIG. 2
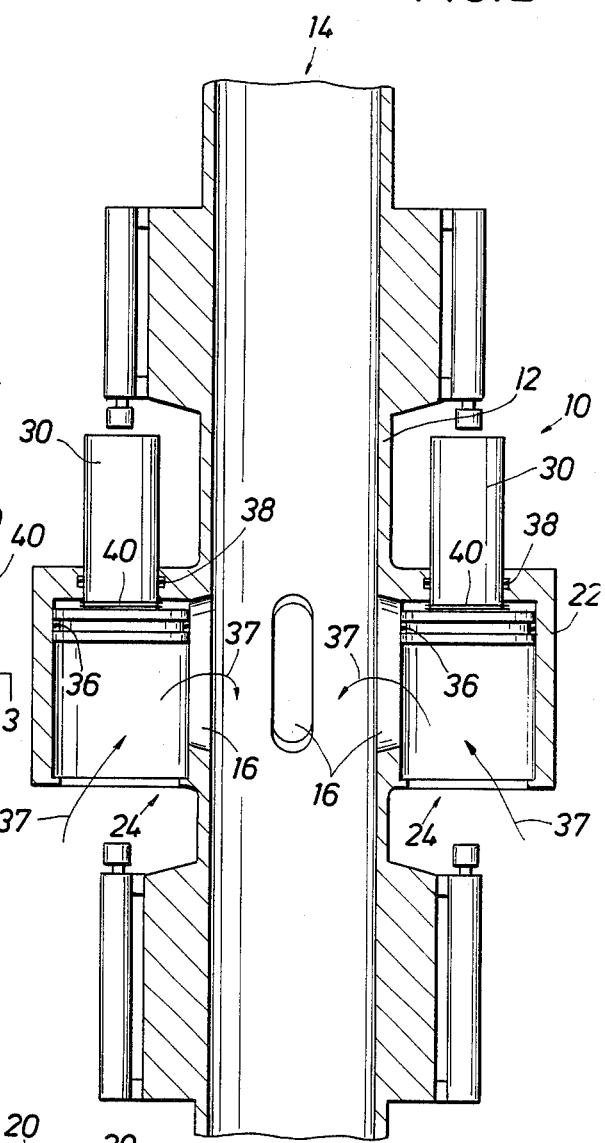
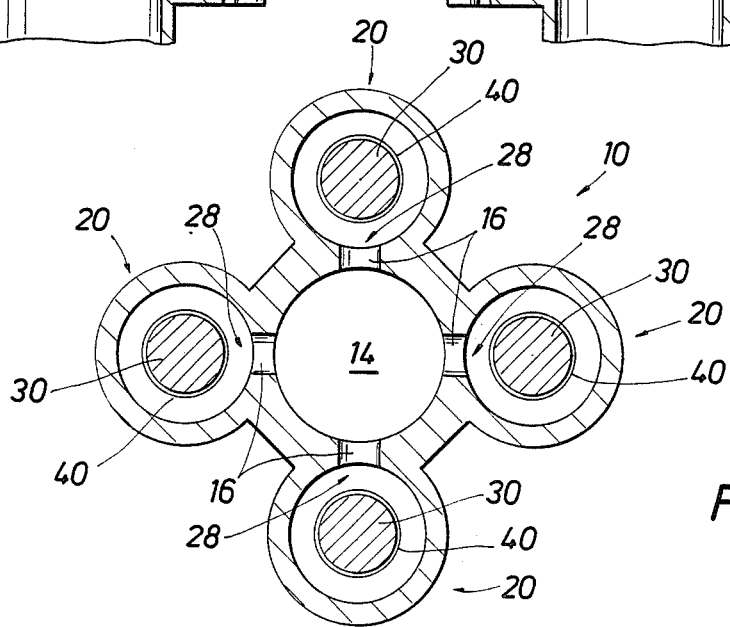
FIG. 3

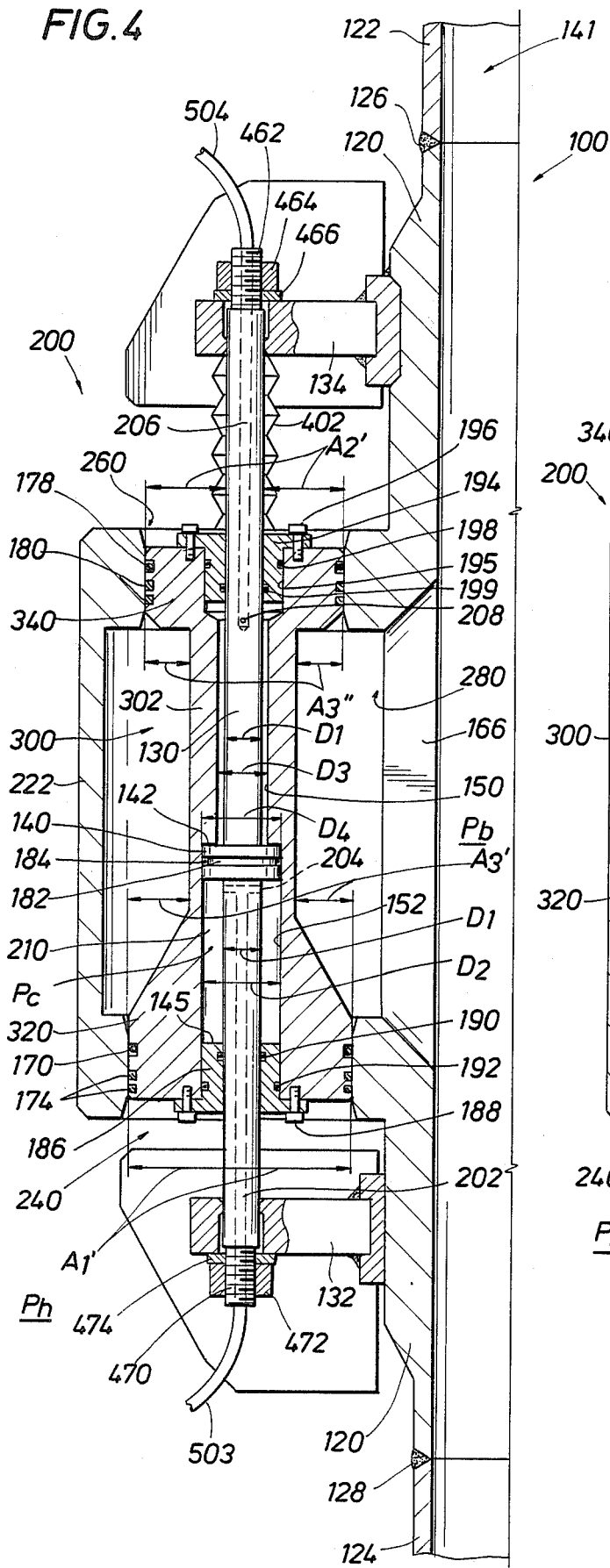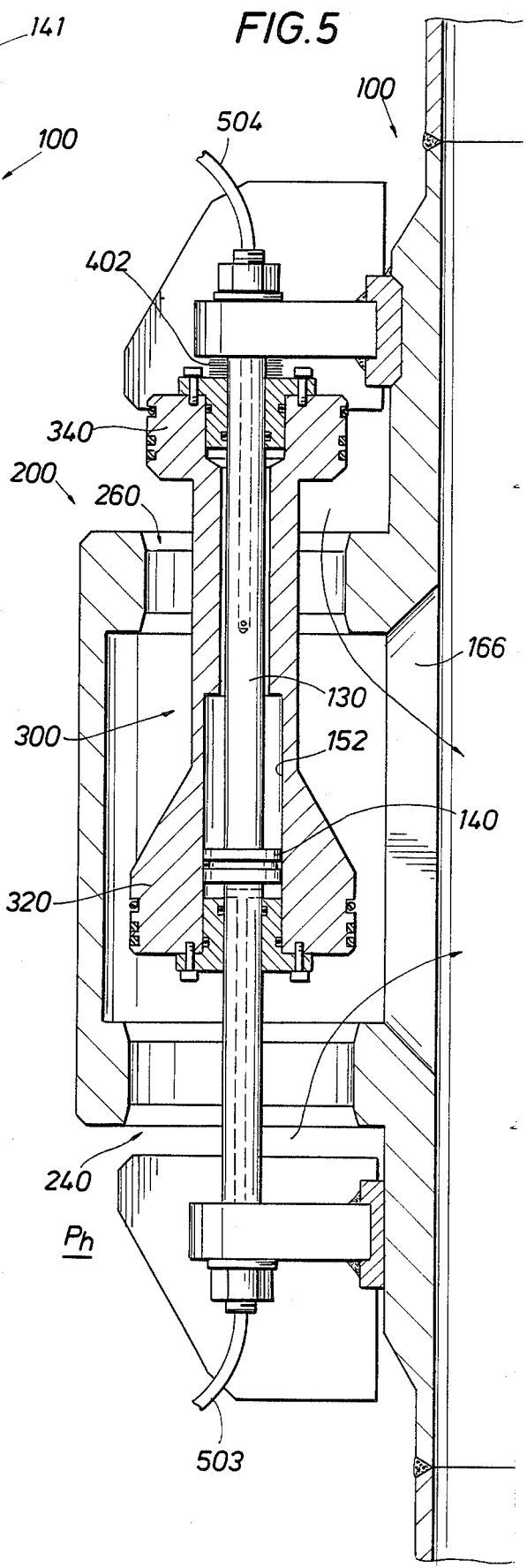

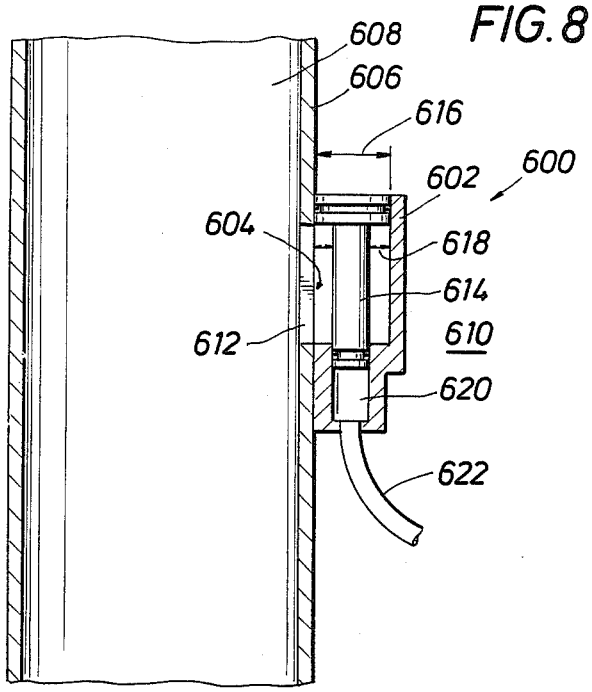
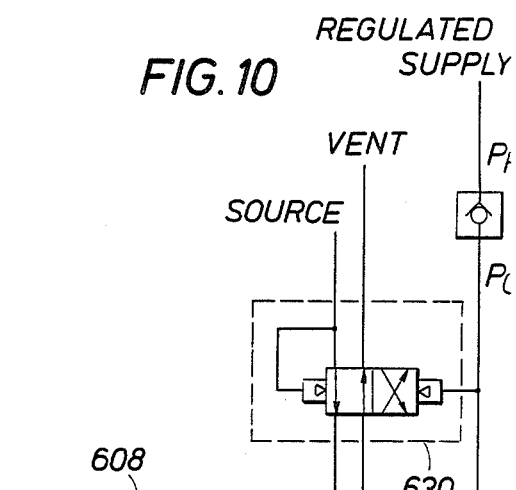
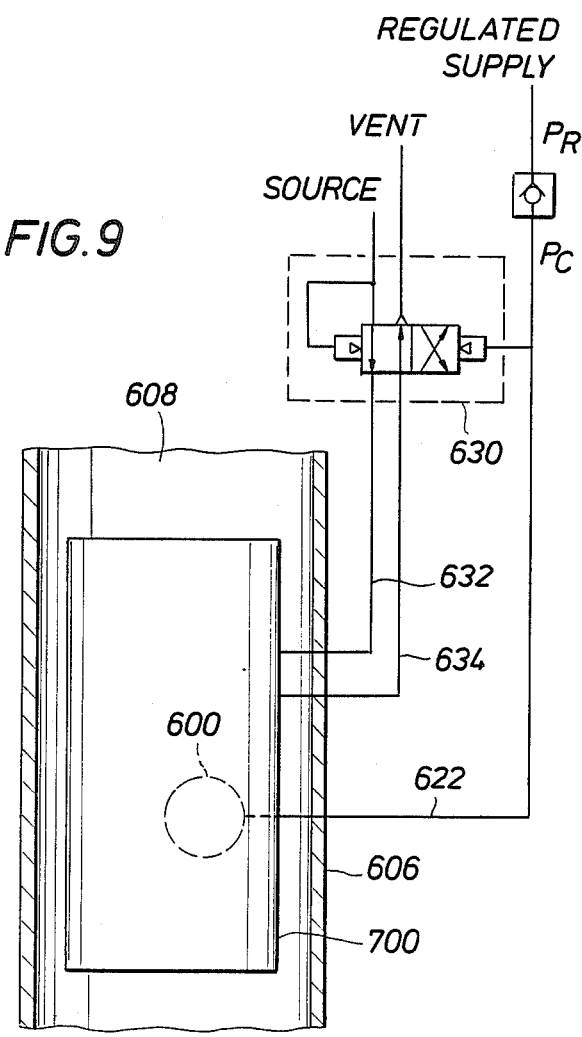

MARINE RISER ANTI-COLLAPSE VALVE

BACKGROUND OF THE INVENTION

1. Field of the Invention

This invention relates in general to the field of marine oil and gas well drilling and in particular to a valve placed in a deep water riser string to prevent collapse of the riser tube by the pressure of the sea water when the internal pressure of the riser drops, for example due to expansion of rising formation gas or loss of circulation and subsequent reduction height of the mud column. Another purpose of this invention is to facilitate opening, by remote control, of the bore at the lower end of the riser so that drill cuttings can be discharged.

2. Description of the Prior Art

One type of prior art marine anti-collapse valve includes a plurality of ports in a riser pup joint which are normally closed by an internal sleeve. The sleeve moves upwardly to uncover the ports when a pressure sensor is activated because the pressure inside the riser falls below a predetermined level below the ambient ocean pressure. Such a valve, may be self-contained and independent of any control lines, or it can be hydraulically operated through control lines to the surface.

A marine riser anti-collapse valve described in the Composite Catalog published by World Oil (1978–79) at page 6857 by Vetco Offshore, Inc., includes a plurality of ports in a riser pup joint normally covered by an external sleeve. A differential pressure sensor is mounted on the riser joint below the sleeve. The pressure sensor, a balanced spool type hydraulic valve, senses a difference in hydrostatic head of a preset value between the inside and the outside of the riser. If the internal pressure drops below the external hydrostatic pressure, the pressure sensor shifts position causing a hydraulic control system to apply hydraulic supply to open four hydraulic cylinders linked to the external sleeve. As a result, the sleeve slides up permitting sea water to enter the riser via the ports. Springs maintain the cylinder in the closed position until their force is overcome by the hydraulic supply applied to the cylinders.

Another external sliding sleeve anti-collapse valve or automatic riser fill valve includes two hydraulic overrides which permit the valve to be opened or closed as desired.

A problem common to the prior art sliding sleeve type anti-collapse valves is the difficulty of providing reliable seals between the sliding sleeves and the ports in the riser pup joint wall. Such seals, must be of a complex geometry by virtue of their position on the cylindrical wall of the riser pup joint.

Another disadvantage with prior art riser anti-collapse valves described above concerns the complexity of hydraulic control systems necessary for their operation, particularly with designs which include a diaphragm sensor valve.

Still another disadvantage of the use of diaphragm sensor valves in prior art anti-collapse valves has been that they occasionally have been overly sensitive to a small region of pressure drop within the bore of the riser in proximity to the diaphragm sensor. Anti-collapse valves with such a design may be opened unintentionally by a swabbing action within the riser pup joint where for example, the drilling string is being raised from the borehole.

Another disadvantage of the prior art anti-collapse riser valves described above is that they are inherently slow to open or close by virtue of the massive sleeves used to uncover or cover ports in the body wall of the pup joint.

Another disadvantage of the prior art anti-collapse riser valves described above concerns difficulty of their assembly and repair. Seals and cylinders must fit over riser couplings or the riser pup joint must have a mechanism for it to be disconnected along its body wall. But such a disconnection mechanism inherently presents problems of assembly and preloading necessary for adequate strength and fatigue resistance in order for the riser pup joint to serve as a marine riser tensile member.

Another disadvantage of prior art anti-collapse valves have been fouling or plugging of the sensing means, such as a diaphragm, by solidified drilling mud as solid fragments.

Still another disadvantage of such prior art designs concerns the high expense of a large cylindrical sliding sleeve and a mechanism for disassembling the valves for seal replacements.

IDENTIFICATION OF OBJECTS OF THE INVENTION

A primary object of the invention is to provide a marine riser anti-collapse valve that overcomes the disadvantages identified above of prior art anti-collapse valves. In particular it is an object of the invention to provide a design in which:

simple elastomeric seals are used eliminating the need for seals of complex design;

less massive valve mechanisms are used to cover and uncover body wall ports providing quicker opening of the valve when a sudden drop in riser pressure is sensed;

assembly of the valve is relatively simple allowing ease of replacement of elastomeric seals; and a plurality of ports open immediately, providing redundancy as compared to a single opening of a cylindrical sleeve, avoiding failure of the valve where a single hydraulic piston jams.

SUMMARY OF THE INVENTION

The objects identified above as well as other features and advantages of the invention result from providing an external valve structure for each of a plurality of openings in the wall of riser pup joint adapted for connection in series with the riser string at a position beneath sea level. Each of the valve structures includes a cylinder having an opening in communication with the body wall opening. A piston in each cylinder is subject to sea water pressure but is prevented from opening when riser bore pressure of a sufficient magnitude is applied internally to the piston via the pup joint opening to the cylinder opening. When the riser bore pressure falls, the piston is driven to an open position allowing sea water to enter the riser.

According to a first embodiment of the invention, each of the valve structures operates automatically without the assistance of hydraulic boost on the piston. The piston within the cylinder has an effective lateral cross-sectional area $A_w$ subject to sea water pressure and includes means for slidable sealing within a cylinder aperture. The piston includes an internal shoulder having an effective lateral cross-sectional area $A_b$ which is subject to the body bore pressure via the body wall opening and the cylinder opening. The weight of the piston and the body bore pressure acting on the area $A_b$ is opposed by the sea pressure acting on the area $A_w$, causing the piston to remain sealed within the cylinder aperture when the body bore pressure is above a predetermined level.

The piston is forced to move longitudinally out of sealing contact with the cylinder aperture when the body bore pressure drops below a predetermined level, operably allowing sea water entry into the bore via the piston aperture, the cylinder opening, and the body wall opening. Such structure allows the automatic entry of sea water into the bore of the riser pup joint and the riser string to prevent collapse of the riser string when the bore pressure of the riser at the pup joint falls below the predetermined level. Auxiliary rods driven by hydraulic pistons are disposed longitudinally below and above the piston to allow for commanded opening or closing of the valve.

According to an alternative embodiment of the invention, an anti-collapse valve assembly is provided having a body adapted for connection in series with a marine riser at a position below the sea level where the body has a bore through it and has an opening in its wall. A valve structure is provided adjacent the exterior of the body wall and includes a cylinder having first and second apertures which are longitudinally spaced from each other. The cylinder includes an opening in its wall which is in fluid communication with the body opening.

A guide rod having a first end and a second end extends through the cylinder via the first and second apertures and is secured to the body above and below the cylinder apertures. The guide rod includes a torus having an outer diameter greater than the outer diameter of the rod and is disposed in the cylinder between the first aperture and the second aperture. The torus has a first annular surface on its first or lower side and a second annular surface on its second or upper side.

A piston is slidingly disposed about the guide rod and includes a first piston head subject to sea water pressure and a second piston head subject to sea water pressure. The first and second piston heads are connected by means of a longitudinal member. The piston has lateral internal surfaces subject to bore pressure within the body. The piston includes a first longitudinal bore through the first piston head and a first part of the longitudinal member and a second longitudinal bore through the second piston head and a second part of the longitudinal member. The first and second longitudinal bores are connected.

The second longitudinal bore has an inside diameter larger than the outer diameter of the guide rod operably permitting the longitudinal movement of the piston with respect to the guide rod. The first longitudinal bore has an inside diameter larger than the torus outer diameter operably permitting sliding longitudinal movement of the second piston longitudinal bore with respect to the torus.

Sealing means such as elastomeric O-rings are disposed between the first piston head and the first cylinder aperture, between the second piston head and the second cylinder aperture, between the outer diameter of the torus and the second longitudinal bore, between the first piston head and the guide rod, and between the second piston head and the guide rod. Such sealing means allow the piston to move with respect to the cylinder apertures and also with respect to the guide rod while maintaining pressure chambers within the longitudinal bores of the piston both below and above the torus.

A first flow passage is provided in the guide rod extending from the first or lower end of the guide rod to a hole in the guide rod disposed between the first or lower side of the torus and the sealing means between the first or lower piston head and the guide rod. A second flow passage is provided in the guide rod extending from the second or upper end of the guide rod to a hole in the guide rod disposed between the second or upper side of the torus and the sealing means disposed between the second or upper piston head and the guide rod.

An annulus between the guide rod and the first longitudinal bore and between the second annular surface of the torus and the means for sealing the first piston head to the guide rod defines a pressure sensing chamber when the second piston head is in sealing engagement with the second cylinder aperture.

A hydraulic circuit is provided for applying regulated operating pressure fluid via a check valve to the pressure sensing chamber via a first hydraulic line and the first flow passage and for venting the second flow passage via a second hydraulic line to the sea.

A differential pressure sensor valve is connected to the first line the responsive to a predetermined increase of pressure in the pressure sensing chamber, and consequently in the first line, proportional to a drop in pressure within the bore of the body for switching the regulated operating pressure via the second hydraulic line to the second flow passage and venting the first flow passage to the sea. Such switching of regulating operating pressure causes the piston to move toward the second end of the guide rod operably opening at least one of the first and second apertures to the sea and to the interior of the cylinder and the bore of the body.

Preferably, four of such valve structures described above are provided, one each about an associated port in the body wall. The differential pressure switch and subsea control valve structures are manifolded on the body of the anti-collapse valve. A manual open line, an operating pressure regulator line and a manual close line are run to the subsea hydraulic circuit from a surface control panel.

In operating during the normal drilling mode, the pistons of the valves are in a first or lower position. So long as the mud column head pressure within the bore of the body is sufficiently high, its action on the differential area within the piston serves to maintain each piston in the closed position. As the mud column head pressure diminishes, the differential pressure in the pressure chamber within the piston increases from a negative to a positive quantity. The differential pressure within the chamber is fed back to the differential pressure sensor valve via the first or lower flow passage and first hydraulic line. When that pressure reaches a predetermined positive value, the differential pressure sensor valve is opened thus actuating a main control valve in the hydraulic circuit means. This action vents the pressure chamber and applies regulated supply pressure to the upper longitudinal bore in the piston thereby driving the pistons to an open position and allowing sea water to flow into the bore of the body and the riser.

BRIEF DESCRIPTION OF THE DRAWINGS

The objects, advantages and features of the invention will become more apparent by reference to the drawings which are appended hereto and wherein like numerals indicate like parts and wherein a preferred embodiment of the invention as shown, of which:

FIGS. 1–3 illustrate a preferred first embodiment of the invention, and FIGS. 4–7 illustrate a preferred alternative embodiment of the invention, specifically:

FIG. 1 illustrates in a cross-sectional view a marine riser anti-collapse valve assembly in which an external cylinder/piston arrangement is in a closed position but which automatically opens when the pressure in the bore of the valve assembly drops to a predetermined value;

FIG. 2 illustrates a similar cross-sectional view of the anti-collapse valve assembly showing the pistons in an open position allowing sea water to flow into the riser;

FIG. 3 shows a cross-sectional view taken along lines 3—3 of FIG. 1 and illustrates the openings in the body wall of the valve assembly and shows four external cylinders each having an opening in its wall in communication with the opening in the body wall;

FIG. 4 illustrates an alternative preferred embodiment of the invention showing a cross-section of an anti-collapse valve assembly having an opening in its body wall having an external cylinder disposed thereabout and having a guide rod extending between apertures in the cylinder and having a two-headed piston mounted on the guide rod and defining a pressure chamber therein when the piston is in a closed position;

FIG. 5 illustrates a cross-section of the valve assembly of FIG. 4 after the piston has been driven to an upward position operably allowing sea water entry into the body of the valve assembly;

FIG. 6 is a top view partially cut away of a portion of the anti-collapse valve assembly and further illustrates the orientation of choke/kill lines and hydraulic lines in proximity to the anti-collapse valve assembly adapted for connection in series with a marine riser string;

FIG. 7 illustrates hydraulic circuitry used with the anti-collapse valve assembly of FIG. 4 and shows a circuit arrangement for automatic operation of the valve should the pressure within the bore drop below a preselected amount and hydraulic means for opening or closing the valve from a surface location;

FIG. 8 is a schematic cross-sectional illustration of the pressure sensor according to the invention; and FIGS. 9 and 10 show the schematic pressure sensor integral with a valve and separate from a valve of an anti-collapse riser system.

DESCRIPTION OF THE INVENTION

Preferred First Embodiment of the Invention

Figure 6:
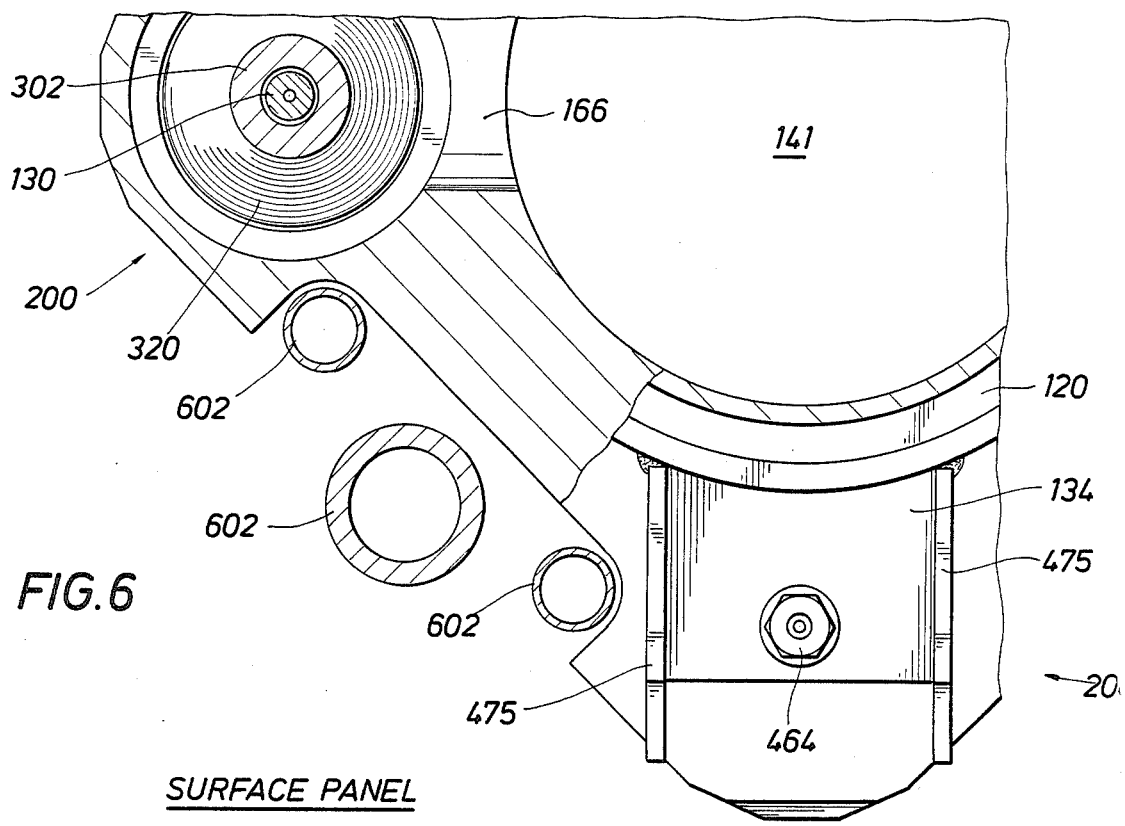

FIG. 1 illustrates a cross-sectional view of a preferred first embodiment of the invention which includes a body 12 adapted for placement in series with riser joints to provide a complete riser string between a blowout preventer stack on the sea floor and a floating drilling vessel on the sea surface. The body 12 includes a bore 14 which communicates with the bore of the riser string.

The body 12 includes at least one but preferably four openings 16 in its body wall. Three such openings are illustrated in FIG. 1. A valve structure 20 is associated with each one of the openings 16 and includes a cylinder 22 having an opening 28 in its longitudinal wall in communication with an opening 16 of the body 12. The cylinder includes a first or lower cylinder aperture 24 and a second or upper cylinder aperture 26.

Disposed within cylinder 22 is piston 30 having a lower or first piston head 32 and a second or upper piston head 34. The piston 30 is shown in the closed position of the valve structure in FIG. 1. The first piston head 32 carriers an elastomeric O-ring 36 in a groove about its outer periphery which provides slidable sealing engagement with the cylinder within the first cylinder aperture 24. In a similar fashion, an O-ring 38 is provided in a groove about the internal periphery of the upper cylindrical aperture 26 providing slidable sealing of the second piston head 34 with respect to the upper cylinder aperture 26. An annular shoulder 35 is provided on the upper side of the first piston head 32.

The anti-collapse valve assembly 10 in use is disposed beneath the sea in series with the marine riser string and as a result external sea water pressure, designated $P_h$, is illustrated as acting upon the effective lateral area $A_1$ of the first piston head 32 as illustrated in FIG. 1. Likewise, the pressure $P_h$ acts upon the effective lateral area $A_2$ facing the sea upon the second piston head 34. In addition, the bore pressure within the riser, designated $P_b$ in FIG. 1, acts upon the area $A_3$ which is illustrated as being the effective annular area of annular shoulder 35. A spring 40 may be provided to supply a downward force on the piston 30. Of course, the piston has a mass which when acted upon by gravity results in a weight $W_p$ tending to force the piston downwardly also.

A force relationship exists whereby, without the spring acting on the piston, the head pressure $P_h$ multiplied times the effective area of the piston acts to move the piston in an upward direction to an open position. In the embodiment of FIG. 1, the effective area on which the sea head pressure $P_h$ acts is the difference between the area $A_1$ and $A_2$. In a similar fashion, the pressure $P_b$ within the bore 14 acts upon the effective area within the piston heads, in this case the area illustrated as $A_3$.

So long as the pressure $P_b$ is sufficiently great when acting upon the area $A_3$ in combination with the weight $W_p$, to be greater than the effective upward force of the sea head pressure $P_h$, the piston remains in a closed position as illustrated in FIG. 1.

The force relationship, assuming a spring 40 is not provided and neglecting frictional and hydraulic forces acting on the piston, may be written for the condition necessary so that the piston will remain closed:

$$P_b(A_3) > P_h(A_1 - A_2) - W_p.$$

If the piston is designed as illustrated, $A_1 - A_2 = A_3$, and the relationship may be written, $$P_b > P_h - (W_p/A_3).$$

The valve will automatically open when the pressure $P_b$ within the bore 14 falls to a level such that the downward forces acting on the piston 30 no longer balance the upward forces, that is, $P_b(A_3) < P_h(A_1 - A_2) - W_p$. Of course, if a spring 40 is included as illustrated in FIG. 1, the valve structure 20 remains closed so long as $P_b(A_3) > P_h(A_1 - A_2) - W_p - F_s$, where $F_s$ represents the downward force of the spring 40 on the first piston head 32. Similarly, the valve opens automatically when the drilling fluid pressure $P_b$ drops to a level such that $P_b(A_3) < P_h(A_1 - A_2) - W_p - F_s$.

If the piston is designed as illustrated where $A_3 = A_1 - A_2$, the relationship may be written, $$P_b < P_h - (W_p - F_s)/A_3.$$

FIG. 2 illustrates the condition of the anti-collapse valve assembly 10 after the pressure $P_b$ has dropped sufficiently where the pistons 30 have been driven to an upward position. The arrows 37 illustrate the entry of sea water via the first cylinder aperture 24 and the opening 28 in the cylinder wall and the opening 16 in the body wall 12.

FIG. 3 illustrates a cross-sectional view taken along lines 3—3 of FIG. 1 and shows the body 12 of the anti-collapse valve 10 and further shows the openings 28 in the cylindrical structures which communicate with the openings 16.

Turning again to FIGS. 1 and 2, a first rod 42 disposed within a hydraulic cylinder 44 is disposed beneath the piston 30 such that upon operation of a piston within the hydraulic cylinder 44 the rod 42 moves upwardly forcing the piston 30 within cylinder 22 to an upward position as shown in FIG. 2. As shown, the rod 42 and hydraulic cylinder 44 provide a mechanism by which the valve structures may be moved to an open position on command. Similarly, rods 46 and hydraulic cylinders 48 are disposed above the piston 30. Upon actuation of a hydraulic cylinder 48, its piston therein and the associated rod 46 move downwardly to act upon the second piston head 34 operably forcing piston 30 downwardly until it reaches a closed position as shown in FIG. 1. Thus, hydraulic cylinder 48 and rod 46 provide a mechanism by which the valve structure 20 may be closed on command.

Alternative Preferred Embodiment of the Invention

FIGS. 4 and 5 show an alternative preferred embodiment of the invention in which the valve structure 200 is disposed about an opening 166 in the wall of the body 120 of an anti-collapse valve assembly 100. The body 120 may be joined by welds 126 and 128 in series with members 122 and 124 having means (not shown) for connecting it to an upper riser string section and a lower riser srring section. The entire unit comprising body 120 and members 122 and 124 define an anti-collapse valve or "pup" joint assembly 100. The bore 141 of the anti-collapse valve 100 communicates with the bore of the marine riser string.

The valve structure 200 includes a cylinder 222 disposed about the exterior of the body 120 and has an opening 280 in its wall in communication with the opening 166 in the wall of the body 120. The cylinder 222 includes a first or lower cylinder aperture 240 and a second or upper cylinder aperture 260. A guide rod 130 is disposed through the first cylinder aperture 240 and second cylinder aperture 260 and is supported to the body by means of a first or lower securing bracket 132 and a second or upper securing bracket 134. The details as to how the guide rod 130 is secured to the brackets will be described below.

The guide rod includes a torus 140 having an outer diameter greater than that of the guide rod 130. The torus 140 is placed between the first cylinder aperture 240 and the second cylinder aperture 260. As illustrated in FIG. 4, the diameter of the guide rod is $D_1$ which is smaller than the diameter $D_4$ of the torus 140. A piston 300 is disposed about the guide rod 130. The piston 300 includes a first or lower piston head 320, a second or upper piston head 340 and a longitudinal member 302 which connects the first and second piston heads.

The piston 300 has a longitudinal dimension such that when the lower piston head 320 is in sealing engagement within the first cylinder aperture 240, the second piston head 340 is in sealing engagement with the upper cylinder aperture 260. An elastomeric seal ring 170 and anti-extrusion metallic rings 174 provides sliding sealing between the first piston head 320 with respect to the lower cylinder aperture 240. Likewise, the elastomeric seal ring 178 and the anti-extrusion metallic rings 180 provide sliding sealing between the second piston head 340 and the second cylinder aperture 260.

The piston 300 has a first or lower longitudinal bore 152 having a diameter $D_2$ which is slightly larger than the diameter $D_4$ of the torus 140. A second or upper longitudinal bore 150 extends from the first longitudinal bore 152 longitudinally through the second piston head 340. The second longitudinal bore 150 has an outer diameter $D_3$ greater than the diameter $D_1$ of the guide rod. An elastomeric ring 184 in a groove 182 about the outer periphery of the torus 140 provides sliding sealing engagement between the inner periphery of the first longitudinal bore 152 and the outer periphery of the torus 140.

A first or lower sealing gland 186 is provided about the guide rod 130 within the first longitudinal bore 152 and is secured to the first piston head 320 by means of bolts 188. Elastomeric rings 192 and 190 provide sliding sealing engagement between the lower sealing gland 186 and the guide rod 130.

Similarly, a second or upper sealing gland 194 is disposed within a bore 195 which communicates with the upper longitudinal bore 150. The upper sealing gland 194 is secured to the upper piston head 340 by means of bolts 196 and includes elastomeric rings 198 and 199 to provide sliding sealing engagement of the gland 194 with respect to the guide rod 130.

A first or lower flow passage 202 is disposed longitudinally through the lower portion of guide rod 130 and communicates with a first hydraulic line 503 coupled to the end of the guide rod 130. The first flow passage 202 is terminated by holes 204 in the guide rod below the torus 140.

A second or upper flow passage 206 is longitudinally provided through the upper portion of the guide rod 130 and is coupled at its end to a second hydraulic line 504. The second flow passage 206 is terminated by one or more holes 208 disposed beneath the second sealing gland 194 when the second piston head 340 is in the closed position as illustrated in FIG. 4.

When the piston 300 is in the closed position as that illustrated in FIG. 4, a pressure chamber 210 is defined by the space of the annulus between the outer diameter $D_1$ of the guide rod 130 and the inner diameter $D_2$ of the first longitudinal bore 152 within the piston 300 and beneath the lower or first annular surface 144 of the torus 140 and above the upper annular surface 145 of the first sealing gland 186. The pressure chamber 210 as defined above, is in communication with the lower flow passage 202 and the first hydraulic line 503 by way of the holes 204.

Figure 7:
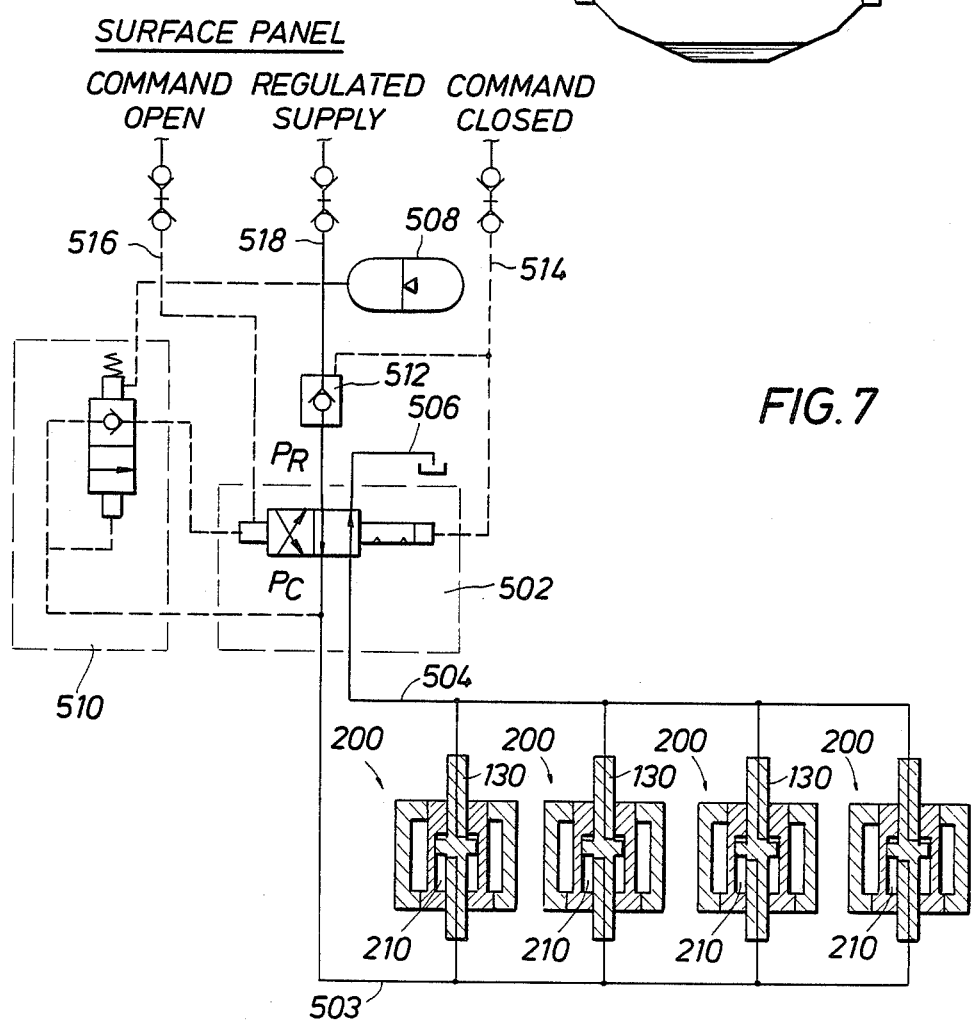

Turning now to FIG. 7, a hydraulic switch 502 is illustrated as communicating with the first hydraulic line 503 and the second or upper hydraulic flow line 504. Such lines are provided in parallel to the guide rods and flow passages (illustrated in FIG. 4) of four valve structures disposed about the periphery of the body 120. As illustrated in FIGS. 4 and 7 a regulated supply of pressure $P_R$ is provided from a surface supply of pressurized hydraulic fluid and is directed to the hydraulic line 503 and into the pressure chamber 210 via the lower flow passage 202 and holes 204 within the guide rod 130.

Turning again to FIG. 4, a description of the forces acting upon a piston 300 is necessary to understand the operation of the valve. As previously discussed, the valve is disposed in a riser string beneath the surface of the sea and thereby encounters a sea water pressure head $P_h$. The pressure of the sea water acts upon the first piston head 320 and upon the second piston head 340. The forces acting on the piston produce a net upward force on the piston equal to the pressure of the sea water $P_h$ times the differential effective lateral area of the piston, that is $A_1' - A_2'$. $A_1'$ represents the annular area facing the sea water of the lateral area of the first piston head 320, while $A_2'$ represents the annular lateral area facing the sea water of the second piston head 340. The amount of upward force on the piston is controlled by adjusting the relative magnitudes of the areas $A_1'$ and $A_2'$. In addition to the weight of the piston, the pressure of the drilling fluid in the bore 141, $P_b$, acts upon the effective annular surfaces within the cylinder 222 on the piston 300. As illustrated in FIG. 4, the drilling fluid pressure $P_b$ acts downwardly upon the lateral effective lateral annular area $A_3'$ and acts to move the piston upwardly by its action upon the effective lateral annular area $A_3''$. Because area $A_3'$ is greater than area $A_3''$ the net effect of the borehole pressure $P_b$ is to force the piston 300 downwardly.

So long as the pressure in the bore of the riser string $P_b$ is sufficiently great to maintain the piston in the closed position illustrated in FIG. 4, the piston remains in sealing position with its first piston head 320 within the first cylinder aperture 240 and the second piston head 340 within the second cylinder aperture and the body opening 166 remains closed to sea water. If the pressure $P_b$ drops, the pressure of the sea water $P_h$ acting on the differential effective lateral area of the piston, that is $A_1' - A_2'$, is greater than the pressure $P_b$ of the bore of the body 141 acting on the differential effective lateral annular area on the internal surfaces of the piston, that is $A_3' - A_3''$, and the piston is urged slightly upwardly. The slight upward urging of piston 300 caused by the drop in pressure of the bore $P_b$ causes the pressure, $P_c$ within chamber 210 to be communicated by means of the first hydraulic line 503 back to the hydraulic switch 502 and the differential pressure sensor/switch 510 illustrated in FIG. 7. Such pressure can not be communicated to the surface via line 518 by virtue of check valve 512, but when a predetermined level of pressure $P_c$ is reached, the differential pressure sensor/switch 510 changes positions and causes the hydraulic switch 502 to reverse the connection of lines 503 and 504 to the regulated supply. When the second hydraulic line 504 is connected to the regulated supply and the first hydraulic line 503 is connected to the vent line to the sea, then the hydraulic fluid of accumulator bottle 508 is applied directly and quickly to the line 504 and is applied, as illustrated in FIG. 4, via the second flow passage 206 and the hole 208 within the annulus between the second or upper longitudinal bore 150 within piston 300 and the outer diameter of the guide rod 130. The accumulator bottle 508 supplies the hydraulic fluid under pressure and such pressurized fluid beneath the second or upper sealing gland 194 moves the piston 300 quickly upwardly until a position is reached as illustrated in FIG. 5 where the first cylinder aperture 240 and the second cylinder aperture 260 are open to the sea. As a result, sea water flows through those apertures and into the opening 166 of the body 120 thereby providing an immediate insertion of sea water and equalization of the pressure between the outside and the inside of the riser string.

FIG. 7 illustrates that if pressurized hydraulic fluid is applied to line 154, the hydraulic switch 502 returns to the position illustrated in FIG. 4 whereby supply pressure is applied to line 503 and line 504 is vented to the sea. Thus, the valve assembly 100 in an open position may be returned to a closed position. The valve assembly 100 may be operated as a dump valve by applying pressurized hydraulic on line 516 when the valve is in the closed position. The hydraulic switch 502 is switched whereby the first hydraulic line 503 is vented via line 506 to the sea and the line 504 is connected to the source of pressurized hydraulic fluid and the valve opens as described previously when the regulating supply is applied normally to line 518.

It should be apparent that the regulated supply pressure on line 518 may be varied by changing its pressure $P_R$. Thus, the valve 100 according to the invention, may be placed at different depth locations in the sea and have its opening pressure $P_R$ thereby correspond to the depth of the sea water head pressure $P_h$ according to the force equations described above. While the hydraulic switch 502 is in the configuration illustrated in FIG. 7, the valve automatically opens at any depth location within the sea by varying the pressure $P_R$ from the regulating supply on line 518.

As discussed previously, all of the valve structures 200 are connected in parallel to lines 503 and 504 and all act simultaneously to open the bore of the anti-collapse valve to sea water. An advantage of this invention in the configuration illustration in FIG. 7 is that if one of the pistons 300 should become stuck or jammed for any reason, the other valves will open independently and provide entry paths of the sea water into the bore of the riser string.

Returning again to FIG. 4, a protective diaphragm 402, preferably constructed of elastomeric material, is connected between the second securing bracket 134 and the top lateral surface of the second or upper piston head 340 while enclosing the portion of the guide rod 130 disposed through it. Such protective diaphragm 402 prevents contamination of that portion of the rod thereby increasing the chances for reliable operation of the valve when the piston 300 is stroked upwardly. Thus, the upper sealing gland 194 has a relatively clean outer surface of the guide rod upon which to slide. The protective diaphragm 402 is shown in a compacted position in FIG. 5 after the piston 300 has been moved upwardly to an open position.

The guide rod 130 is held at its upper position within the second or upper securing bracket 134 by means of a shim 466 and nut 465 threadedly engaged about threaded end 462. In a similar manner, the lower end of the guide rod 130 is secured to the lower securing bracket 132 by means of shim 474 and the nut 472 threadedly engaged about the threaded end 470 of the guide rod 130.

FIG. 6 is a plan view of the valve structure, partly in section showing the nut 464 and the upper securing bracket 134 which secures the upper end of guide rod 130 to the body 120 of anti-collapse valve 100. Protective fenders 475 are disposed radially outwardly from the body in order to protect the guide rod from damage. Also, shown in FIG. 6 is the placement of a choke/kill line 602 between two valve structures 200. Also shown are hydraulic line bundles 602 which carry hydraulic lines from the drilling vessel to subsea valve and control systems.

One of the features of the preferred embodiment of the invention apparent from FIG. 4 as compared to prior art anti-collapse valves, is that seals such as are in the piston heads 186 and 340 and in the first or lower sealing gland 186 and the upper or second sealing gland 194 and in the torus 140 may be of conventional design. Indeed such sealing devices are preferably conventional O-rings. Such O-rings may be easily replaced by disconnecting the guide rod 130 from the lower securing bracket 132 and removing the piston 300 downwardly from cylinder 222.

Another feature of the invention as compared to prior art anti-collapse valves is that the piston of each of the valves is relatively less massive than a larger diameter riser sleeve operably providing quicker reaction time when the pressure drop in the bore of the riser is rapid.

Still another advantage of the invention is one that was mentioned previously in that the valve has inherent redundancy because the valve will continue to operate even if one of the pistons were to stick or become jammed.

Another advantage of the alternative embodiment of the invention illustrated in FIGS. 4, 5, 6 and 7, concerns the capability of adjusting the differential pressure drop to which the valve is sensitive from the surface, that is by changing the regulating pressure supply level $P_R$ on line 518 of FIG. 7, thereby changing the cracking pressure $P_c$ at which sensor/switch 510 operates.

Still another advantage of the invention relates to the fact that the pressure sensor is immune to contamination fouling because the pressure sensor is within the pressure chamber 210 and not subject to direct entry of sea water.

Still another advantage of the invention relates to the capability of designing the opening 166 in the body wall to have a relatively long longitudinal extent thereby making the valve less susceptible to actuation by swabbing where, for example, the drill string and bit are removed upwardly from the well and through the riser.

Still another advantage of the invention relates to the provision of the accummulator bottle 508, as illustrated in FIG. 7, which provides a downhole source of pressurized fluid directly to the line 504 when the hydraulic switch 502 is activated. Such accumulator bottle results in a reduction of opening time because pressurized hydraulic fluid need not make the long travel distance from a surface location to the subsurface valve.

Schematic Description of the Pressure Sensor of the Invention

The pressure sensor chamber 210 described in connection with the alternative preferred embodiment of the anti-collapse valve assembly 100 of FIGS. 4 and 5, may be explained more simply by referring to FIG. 8. A pressure sensor 600 is shown having a cylindrical structure 602 having an opening 604 in its wall. The structure 602 is secured to a body 606 which may be a riser tube. The tube 606 carries a fluid 608, which may be drilling fluid, and is immersed in a fluid 610, which may be sea water. The tube 606 has an opening 612 in its wall. Opening 612 is in fluid communication with opening 604 of structure 602, which preferably is a cylinder.

Cylinder 602 carries a piston 614 having a first area 616 subject to sea water 610 pressure and a second area 618 subject to the drilling fluid 608 pressure via openings 612 and 604. A chamber 620 is provided in the structure 602 and has hydraulic fluid of pressure of a predetermined amount applied to it via hydraulic line 622. The volume of chamber 620 is variable in proportion to the position of piston 614 in cylinder 602. The product of the sea water 610 pressure and the area 610 of piston 614 tends to move the piston 614 downwardly within the cylinder 602. The product of the drilling fluid 608 pressure and the area 618 of the piston tends to move the piston upwardly within the cylinder 602. A change in pressure in the hydraulic line 622 is produced proportional to the difference in pressure between sea water pressure and drilling fluid pressure where the drilling fluid 608 pressure drops sufficiently to cause piston 614 to tend to move downwardly.

The sensor 600 may be an integral part of a valve structure 700 for opening or closing a port in a riser 606 as illustrated in FIG. 9. A control valve 630 normally applies source pressure from a hydraulic source to line 632 to close valve 700 about a port or ports within tube 608. If the pressure $P_c$ on line 622 increases to a predetermined amount, control valve 630 switches, reversing lines 632 and 634 thereby opening the valve 700.

The schematic sensor 600/valve 700 arrangement of FIG. 9 is analogous to the arrangement of the alternative preferred embodiment of the invention of FIGS. 4, 5 and 7 where the sensor of the chamber 210 is analogous to chambers 620 and is an integral part of valve structure 200. Line 503/passage 202 is analogous to line 622 of sensor 600. Line 504/passage 206 is analogous to line 634, and a single line 503 serves the dual purposes of lines 622 and 632 of FIG. 9.

FIG. 10 illustrates that sensor 600 need not be integral with valve 700 but may be disposed a distance apart from the valve 700 about another opening in the wall of riser 606.

Various modifications and alterations in the described structures will be apparent to those skilled in the art of the foregoing description which does not depart from the spirit of the invention. For this reason, these changes are desired to be included in the appended claims. The appended claims recite the only limitations to the present invention and the descriptive manner which is employed for setting forth the embodiments and is to be interpreted as illustrative and not limitative.

What is claimed is:

1. A marine riser anticollapse valve assembly comprising, a body adapted for connection in series with a riser string at a position below sea level, said body having a bore through it and having an opening in its wall, a valve structure disposed exterior to said body wall about said body wall opening and including a cylinder having a first cylinder aperture open to sea water and a second cylinder aperture open to sea water, said cylinder having an opening in its wall in fluid communication with said body wall opening, a piston of solid construction and of weight $W_p$ disposed within said cylinder and having a first piston head having a lateral first cross sectional area $A_1$ and means for slidable sealing within said first cylinder aperture and a second piston head having a lateral second cross-sectional area $A_2$ and means for slidable sealing within said second cylinder aperture, said first and second cross-section areas being subject to sea water head pressure $P_h$ via said first and second cylinder apertures each of which is open to sea water, said piston including an internal shoulder of a third lateral cross sectional area $A_3$, said internal shoulder being subject to drilling fluid pressure $P_b$ of said riser via said body wall opening and said cylinder wall opening, whereby said valve structure remains closed so long as the sum of the weight of the piston and the product of drilling fluid pressure and said third lateral cross-sectional area is greater than the product of sea water head pressure and the difference between the lateral first and second cross section areas of said piston heads, or $$P_b(A_3) > P_h(A_1 - A_2) - W_p,$$

and said valve structure automatically opens when the drilling fluid pressure drops to a level such that $$P_b(A_3) < P_h(A_1 - A_2) - W_p.$$

2. The marine riser assembly of claim 1 further comprising spring means for providing a closing force of amount $F_s$ acting on said piston to close said piston whereby said valve structure remains closed so long as $$P_b(A_3) > P_h(A_1 - A_2) - W_p - F_s$$

and said valve structure automatically opens when the drilling fluid pressure drops to a level such that $$P_b(A_3) < P_h(A_1 - A_2) - W_p - F_s.$$

3. A marine riser anticollapse valve assembly comprising,
 a body adapted for connection in series with a riser string at a position below sea level, said body having a bore through it and having an opening in its wall,
 a valve structure disposed exterior to said body wall about said body wall opening and including a cylinder having a first cylinder aperture and a second cylinder aperture, said cylinder having an opening in its wall in fluid communication with said body wall opening,
 a piston of weight $W_p$ disposed within said cylinder and having a first piston head having a lateral first cross sectional area $A_1$ and means for slidable sealing within said first cylinder aperture and a second piston head having a lateral second cross-sectional area $A_2$ and means for slidable sealing within said second cylinder aperture, said first and second cross-section areas being subject to sea water head pressure $P_h$, said piston including an internal shoulder of a third lateral cross sectional area $A_3$, said internal shoulder being subject to drilling fluid pressure $P_b$ of said riser via said body wall opening and said cylinder wall opening,
 whereby said valve structure remains closed so long as the sum of the weight of the piston and the product of drilling fluid pressure and said third lateral cross-sectional area is greater than the product of sea water head pressure and the difference between the lateral first and second cross section areas of said piston heads, or $$P_b(A_3) > P_h(A_1 - A_2) - W_p,$$

and said valve structure automatically opens when the drilling fluid pressure drops to a level such that $$P_b(A_3) < P_h(A_1 - A_2) - W_p,$$

and further including remotely actuatable hydraulic rod means disposed longitudinally aligned with said first piston head and when actuated for engagement with said first piston head for moving said piston longitudinally beyond said first cylinder aperture thereby opening said bore of said body to sea water via said body wall opening and said opening in said cylinder wall.

4. The marine riser of claim 3 further comprising remotely actuatable hydraulic rod means disposed longitudinally aligned with said second piston head and, when said piston has previously been moved to its open position, for moving said piston longitudinally until said first piston head has been moved into sealing engagement with said first cylinder aperture for closing said body to sea water.

5. A marine riser anticollapse valve assembly comprising,
 a body adapted for connection in series with a marine riser at a position below sea level, said body having a bore through it and having an opening in its wall,
 a valve structure disposed adjacent the exterior of said body wall and including
 a cylinder, said cylinder having first and second apertures longitudinally spaced from each other and having an opening in its wall, said cylinder wall opening being in fluid communication with said body opening,
 a guide rod having a first end and a second end and having an outer diameter and extending through said cylinder via said first aperture and said second aperture and secured to said body above and below said cylinder apertures, said guide rod having a torus of an outer diameter greater than said rod outer diameter and disposed in said cylinder between said first aperture and said second aperture, said torus having a first annular surface on a first side and a second annular surface on a second side,
 a piston slidingly disposed about said guide rod and having a first piston head subject to sea water pressure and a second piston head subject to sea water pressure connected by a longitudinal member, said piston having lateral internal surfaces subject to bore pressure within said body, said piston having a first longitudinal bore through said first piston head and a first part of said longitudinal member, and a second longitudinal bore through said second piston head and a second part of said longitudinal member, said first and second longitudinal bores communicating with each other, said second longitudinal bore having an inside diameter larger than said outer diameter of said guide rod operably permitting longitudinal movement of said piston with respect to said outer diameter of said guide rod operably permitting longitudinal movement of said piston with respect to said guide rod, said first longitudinal bore having an inside diameter larger than said torus outer diameter operably permitting sliding longitudinal movement of said first piston longitudinal bore with respect to said torus,
 sealing means disposed between said first piston head and said first cylinder aperture, for slidable sealing of said first piston head to said first cylinder aperture,
 sealing means disposed between said second piston head and said second cylinder aperture for slidable sealing of said second piston head to said second cylinder aperture, sealing means disposed between said outer diameter of said torus and said second longitudinal bore for slidable sealing of said torus to said second longitudinal bore, sealing means disposed between said first piston head and said guide rod for slidable sealing of said first piston head to said guide rod, sealing means disposed between said second piston head and said guide rod for slidable sealing of said second piston head to said guide rod, a first flow passage in said guide rod extending from said first end of said guide rod to a hole in said guide rod disposed between said first side of said torus and said sealing means disposed between said first piston head and said guide rod, a second flow passage in said guide rod extending from said second end of said guide rod to a hole in said guide rod disposed between said second side of said torus and said sealing means disposed between said second piston head and said guide rod, an annulus between said guide rod and said first longitudinal bore and between said second annular surface of said torus and said means for sealing said first piston head to said guide rod defining a pressure chamber when said second piston head is in sealing engagement with said second cylinder, hydraulic circuit means for applying regulated opening pressure fluid to said pressure chamber via a first hydraulic line and said first flow passage and venting said second flow passage via a second hydraulic line to the sea, a differential pressure sensor means connected to said first line and responsive to a predetermined amount of change in pressure in said pressure chamber annulus proportional to a drop in pressure within said bore of said body for applying said regulated opening pressure via said second hydraulic line to said second flow passage and venting said first flow passage to the sea, operably causing said piston to move toward said second end of said guide rod operably opening at least one of said first and second apertures to the sea and the interior of said cylinder and the bore of said body.

6. The assembly of claim 5 wherein said first piston head includes a lateral first effective cross-sectional area $A_1$, subject to sea water pressure, said second piston head includes a lateral second effective cross-sectional area $A_2$, subject to sea water pressure, and said internal surfaces of said piston have an effective differential cross-sectional area $A_3$ subject to said body bore pressure tending to force said piston toward said first end, and wherein said pressure in said pressure chamber is the sum of of said regulated opening pressure and the pressure exerted on said fluid by said piston caused by the difference in areas, $A_1-A_2$ times the sea water pressure less the pressure exerted on said fluid by said piston caused by the effective differential cross-sectional area $A_3$ times the body bore pressure.

7. The assembly of claim 6 further comprising means operable from a surface location for applying said regulated source of pressurized hydraulic fluid to said second flow passage and venting said first flow passage to the sea operably moving said piston, if in a closed position, to an open position for allowing sea water entry into said body bore.

8. The assembly of claim 6 further comprising means operable from a surface location for applying said regulated source of pressurized hydraulic fluid to said first flow passage and venting said second flow passage to the sea operably moving said piston, if in an open position, to a closed position for preventing sea water from entering into said body bore.

9. The assembly of claim 6 further comprising protective means disposed about a portion of said guide rod between said second piston head and a position where said guide rod is secured to said body for preventing sea water contact of said portion of said guide rod operably preventing contamination of said portion.

10. The assembly of claim 6 wherein said sealing means disposed between said second piston head and said second cylinder aperture comprises, an elastomeric ring disposed in a first groove about the outer periphery of said second piston head, and at least one metallic sealing ring disposed in a second groove about the outer periphery of said second piston head.

11. The assembly of claim 6 wherein said sealing means disposed between said first piston head and said first cylinder aperture comprises, an elastomeric ring disposed in a first groove about the outer periphery of said first piston head, and at least one metallic sealing ring disposed in a second groove about the outer periphery of said second piston head.

12. The assembly of claim 6 in which said body has a plurality of openings spaced about the periphery of its wall, with said valve structure being provided for each of said plural openings, each valve stPructure having its cylinder wall opening in fluid communication with its associated body wall opening and with said first hydraulic line and said second hydraulic line each connected respectively in parallel with said first flow passage and said second flow passage of said guide rod of each of said valve structures.

13. Subsea apparatus comprising, a marine riser joint having an opening in its wall, said riser adapted for carrying drilling fluid within its walls and adapted for placement in a marine riser string beneath sea level, and a differential pressure sensor, said sensor including, a cylindrical structure affixed about the exterior of said riser joint wall about said opening of said joint wall, said cylindrical structure having an opening in its wall in fluid communication with said riser joint opening through which drilling fluid is applied to the interior of said cylindrical structure, a piston disposed within said cylindrical structure, said piston having a first area subject to sea water pressure, the product of said sea water pressure and said first area tending to move said piston in a first direction within said cylindrical structure, said piston having a second area subject to drilling fluid pressure and said second area tending to move said piston in a second direction within said cylindrical structure, a chamber within said cylindrical structure, the volume of said chamber being variable in proportion to the position of said piston within said cylindrical structure, a hydraulic sensor line communicating with said chamber, and means for applying hydraulic fluid of pressure of a predetermined amount to said chamber via said hydraulic line, whereby a change in pressure in said hydraulic sensor line is produced proportional to the difference in pressure between said sea water pressure and said drilling fluid pressure.

14. In combination, an apparatus body having an opening in its wall, said body having a first fluid within its walls, said body being disposed in a second fluid outside its walls, and a differential pressure sensor having, a structure disposed in said second fluid exterior to said body and secured about said opening of said apparatus body, said structure having an opening in its wall in fluid communication with said apparatus body opening through which said first fluid is applied to the interior of said structure, a piston disposed within said structure, said piston having a first area subject to the pressure of said second fluid, the product of said second fluid pressure and said first area tending to move said piston in a first direction within said structure, said piston having a second area subject to said first fluid pressure within said body, the product of said first fluid pressure and said second area tending to move said piston in a second direction within said structure, a chamber within said structure, the volume of said chamber being variable in proportion to the position of said piston within said structure, a hydraulic line communicating with said chamber, and means for applying hydraulic fluid pressure of a predetermined amount to said chamber via said hydraulic line, whereby a change in pressure in said hydraulic line is produced proportional to the difference in pressure between said second fluid pressure and said first fluid pressure.

* * * * *